United States Patent [19]
Ledford et al.

[11] Patent Number: 5,719,912
[45] Date of Patent: Feb. 17, 1998

[54] CONTROL ROD FOR A NUCLEAR REACTOR

[75] Inventors: Kevin L. Ledford; Richard D. Wittmeier; Robert B. Elkins, all of Wilmington, N.C.

[73] Assignee: General Electric Company, Schenectady, N.Y.

[21] Appl. No.: 615,879

[22] Filed: Mar. 14, 1996

[51] Int. Cl.⁶ ............................................. G21C 7/10
[52] U.S. Cl. ............................... 376/327; 376/333
[58] Field of Search ........................ 376/327, 333, 376/334, 335; 228/183, 6.1, 44.3

[56] References Cited

U.S. PATENT DOCUMENTS

| | | | |
|---|---|---|---|
| 1,339,970 | 5/1920 | Murray, Jr. et al. | 29/471.1 |
| 1,844,407 | 9/1932 | Murray | 228/183 |
| 2,998,640 | 9/1961 | Huet | 29/157.4 |
| 3,045,340 | 7/1962 | Kolling | 29/471.1 |
| 3,293,403 | 12/1966 | Rudd | 219/104 |
| 3,332,850 | 7/1967 | Jonsson et al. | 376/327 |
| 3,357,083 | 12/1967 | Wiehn et al. | 29/157.3 |
| 3,407,117 | 10/1968 | Lichtenberger | 376/333 |
| 3,712,852 | 1/1973 | Frisher | 376/333 |
| 4,861,544 | 8/1989 | Gordon | 376/333 |
| 4,902,470 | 2/1990 | Dixon et al. | 376/333 |
| 4,980,535 | 12/1990 | Aiello et al. | 219/121.3 |
| 5,225,151 | 7/1993 | Bernander et al. | 376/333 |
| 5,592,522 | 1/1997 | Holden | 376/333 |

FOREIGN PATENT DOCUMENTS

| | | | |
|---|---|---|---|
| 591408 | 1/1960 | Canada | 376/327 |
| 0338772 | 10/1989 | European Pat. Off. | 376/327 |
| 0015592 | 1/1985 | Japan | 376/327 |
| 02289921 | 11/1985 | Japan | 376/327 |
| 3015194 | 1/1988 | Japan | 376/327 |
| 1148996 | 6/1989 | Japan | 376/327 |
| 0055439 | 11/1989 | Japan | 376/327 |
| 4215097 | 8/1992 | Japan | 376/327 |
| 1126218 | 9/1968 | United Kingdom | 376/327 |

*Primary Examiner*—Harvey E. Behrend
*Attorney, Agent, or Firm*—Nixon & Vanderhye

[57] ABSTRACT

The control rod includes a plurality of elongated tubes containing neutron-absorbing material in a planar array to form wings on opposite sides of a central axis of the control rod. Each tube is formed with a plurality of protuberances in excess of four such that the tubes can be welded to adjacent tubes with the weld lines disposed inwardly of the side surfaces of the wings to improve the flexibility of the control rod. The wings of each planar array have connecting elements of each other planar array thereof, enabling lateral movement of the planar arrays of wings relative to one another to further enhance flexibility and movement of the control rod between the fuel channels of the nuclear core.

11 Claims, 6 Drawing Sheets

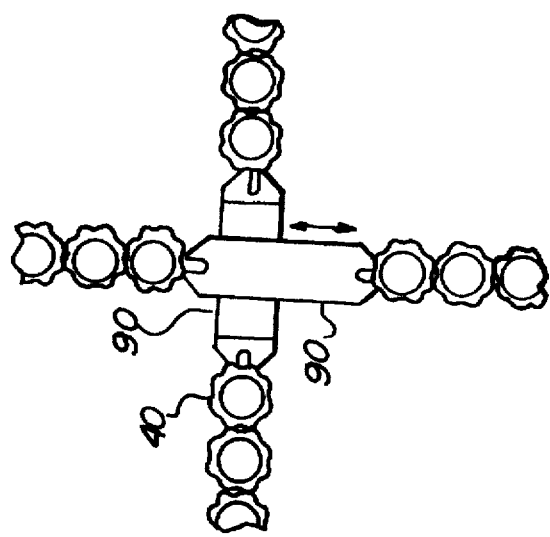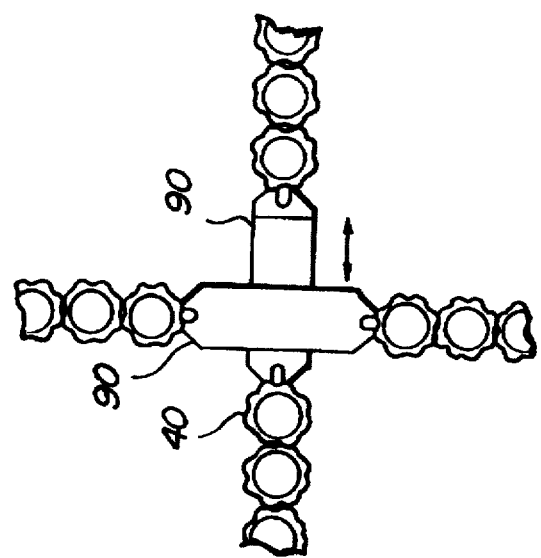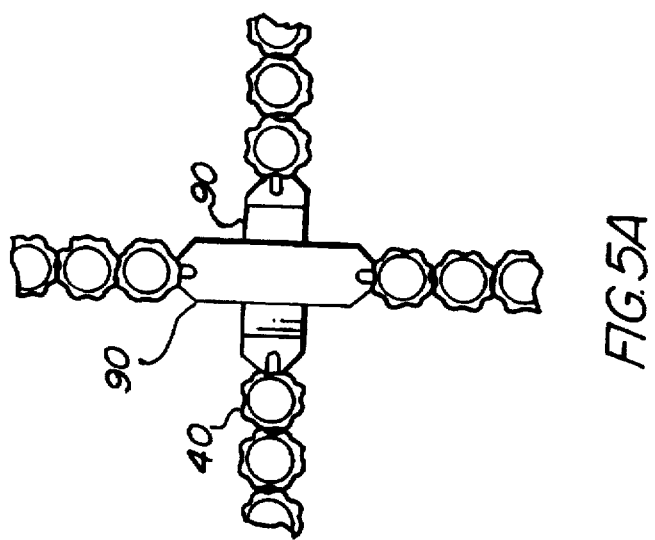

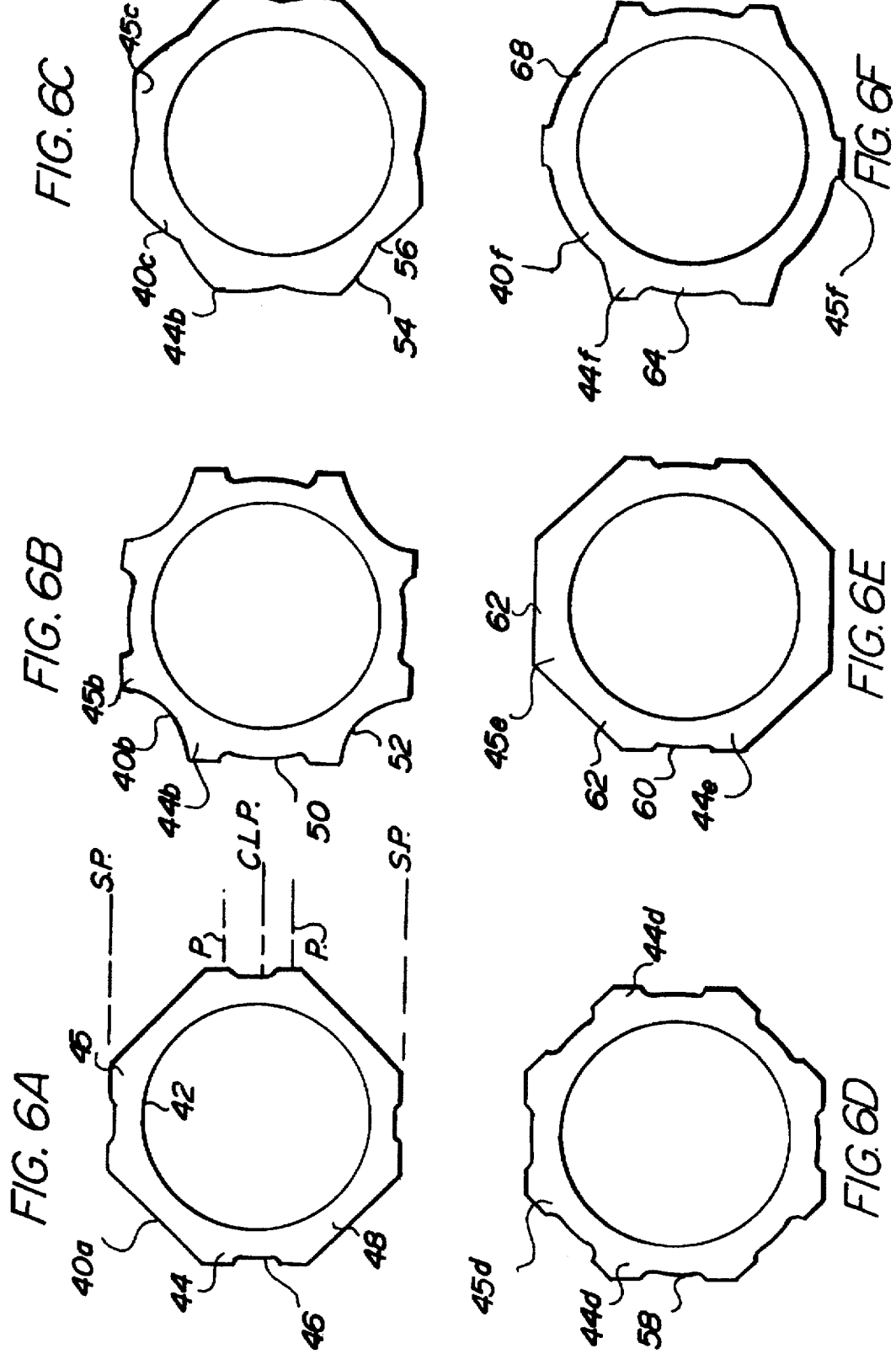

CONTROL ROD FOR A NUCLEAR REACTOR

TECHNICAL FIELD

The present invention relates to a control rod for a nuclear reactor having reduced overall stiffness and improved flexibility. As well known in nuclear reactors, control rods perform power distribution shaping and reactivity control functions in the reactor core. In a BWR, the control rods enter from the bottom of the reactor. Power distribution is controlled by manipulation of selected patterns of rods within the core and reactivity control requires the control rods to be available for a reactor scram or reactivity regulation. Drive mechanisms are provided for axially positioning the rod for reactivity regulation and rapid scram insertion. In a principal design, the control rod is lowered by gravitational forces.

BACKGROUND

Control rods typically comprise a generally elongated control rod body having a cruciform cross-section with a handle at the top and a release handle at the bottom. The wings of the cruciform cross-section each include a plurality of elongated tubes containing neutron-absorbing material such as boron carbide powder. Hafnium rods are also used. The wings of the control rod are connected to one another by a centrally disposed, typically elongated tie rod(s).

One control rod currently in use includes sealed tubes of absorber rods filled with boron carbide and disposed side-by-side within a sheath in each wing of the cruciform control rod. The $B_4C$ powder is loaded directly in the tube and separated by ball bearing spacers into segments. The wings are welded at axially spaced locations to a central tie rod to form the cruciform shape. The sheath of each wing is perforated to allow coolant to flow inside the sheath along the absorber tubes.

In another currently used form of control rod, generally square-shaped absorber tubes are welded in an array to form a wing of the cruciform-shaped control rod. Each wing is welded to a plurality of shortened tie rods at axially spaced locations to form the cruciform shape. Each absorber tube is sealed to create an individual pressure vessel. Encapsulated $B_4C$ powder is disposed in the absorber tubes and hafnium rods are placed along the outermost edges of the wings. Coolant contacts the outer surfaces of the individual absorber tubes. The tubes are individually formed from a hollow cylinder with four protuberances at 90° intervals. The tubes are welded together with the protuberances on opposite sides of each tube being welded to protuberances of the adjoining tube. Both this construction and the previously described construction provide a relatively stiff control rod which has substantial potential for engaging the fuel channels when inserted into the nuclear core. Additionally, over time, the channels surrounding the fuel assemblies change their configuration and tend to bow in a direction toward the control rods. It will be appreciated, therefore, that the stiffer the control rod, the greater the tendency for the rod to bind or impinge against the fuel channels, become stuck within the core or generally to wear the components of the fuel channels and control rod which could lead to corrosion and other problems.

DISCLOSURE OF THE INVENTION

According to the present invention, there is provided a control rod blade which is sufficiently stiff to enable the control rod to be inserted into the reactor for reactivity regulation or during a reactor scram, as well as for power distribution shaping. The control rod, however, has sufficient flexibility so that the risk of wearing by impingement with the fuel channels or becoming stuck within the core is minimized.

According to the present invention, there is provided a control rod with reduced but sufficient stiffness. This is accomplished by (1) shaping and configuring the individual control rod tubes, rendering them more flexible and formed of less material than prior control rod tubes, (2) locating the weld connections between adjoining tubes interiorly of the wings to improve flexibility and (3) providing tie rods for connecting the wings to one another which enable lateral movement of the wings during insertion and withdrawal of the control rod relative to the reactor core. In a preferred embodiment of the present invention, each control rod tube is joined to an adjacent control rod tube, preferably by welding, to form a joint line which is spaced inwardly of the opposite side faces of the wing of the control rod. That is, each tube includes a projection, preferably at least a pair thereof, along opposite sides thereof which are joined with an adjoining pair of projections of an adjacent tube, the weld lines securing the projections to one another being disposed inwardly of planes passing through the opposite side faces of the array of tubes. By locating the weld lines inwardly of the side faces substantially toward the center of the wing, the flexibility of the control rod is significantly increased in comparison with forming weld joints along the side faces of the cruciform control rod.

Preferably, each tube is formed with a plurality of protuberances circumferentially spaced one from the other about the outer surface. This allows less material to be used in the formation of the tubes, decreasing the inertia of each tube, and increasing their flexibility.

Additionally, the ability of the control rod to penetrate and to be withdrawn from the core is enhanced by enabling the wings of the control rod to move laterally relative to one another. More particularly, the wings of the control rod lying in a common plane are secured to one another by elements which may interlock with elements joining the other pair of wings. These elements, i.e., tie rods, preferably interlock one with the other with the base of each element being disposed between the legs of the other element. In this manner, the wings in a common plane may shift laterally relative to the other pair of wings, and when interlocking, the legs of the tie rods can be used as stops to limit the lateral movement of the wings relative to one another.

In a preferred embodiment according to the present invention, there is provided a control rod for a nuclear reactor, comprising a plurality of elongated tubes disposed side-by-side and forming an array thereof between two planes defining respective opposite side surfaces of the array, each of the tubes having neutron-absorbing material and being joined one to the other along joint lines lying in planes spaced inwardly from and parallel to the side planes, the joint lines extending from the side planes a distance equal to or in excess of the distance between a plane through the axes of the tubes and the side planes thereby forming a control rod of reduced stiffness and improved flexibility.

In a further preferred embodiment according to the present invention, there is provided a control rod for a nuclear reactor comprising a control rod body having an axis and mutually perpendicular wings, first and second pairs of the wings lying in respective common planes with the wings of each pair on opposite sides of the control rod body axis, the wings of the first pair being connected to one another by a first element and the wings of the second pair being connected to one another by a second element, the elements being configured to enable lateral movement of the first and second pairs of wings relative to one another.

Accordingly, it is an object of the present invention to provide a novel and improved control rod having improved flexibility and reduced stiffness as compared with prior control rods.

BRIEF DESCRIPTION OF THE DRAWINGS

FIGS. 5A–5C are fragmentary cross-sectional views substantially illustrating the movement of the wings of the control rod according to the present invention;

FIGS. 6A–6F are enlarged plan views of various configurations of control rod tubes according to the present invention.

BEST MODE FOR CARRYING OUT THE INVENTION

Figure 1:
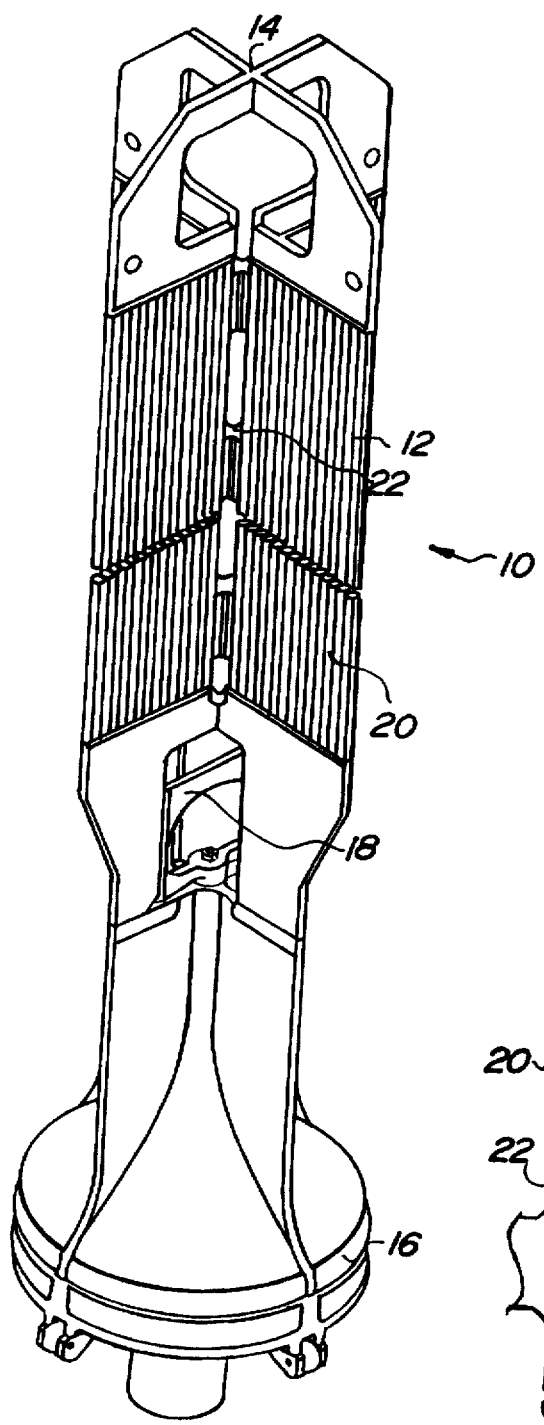
FIG. 1 is a perspective view of a control rod constructed in accordance with the prior art.
Figure 2:
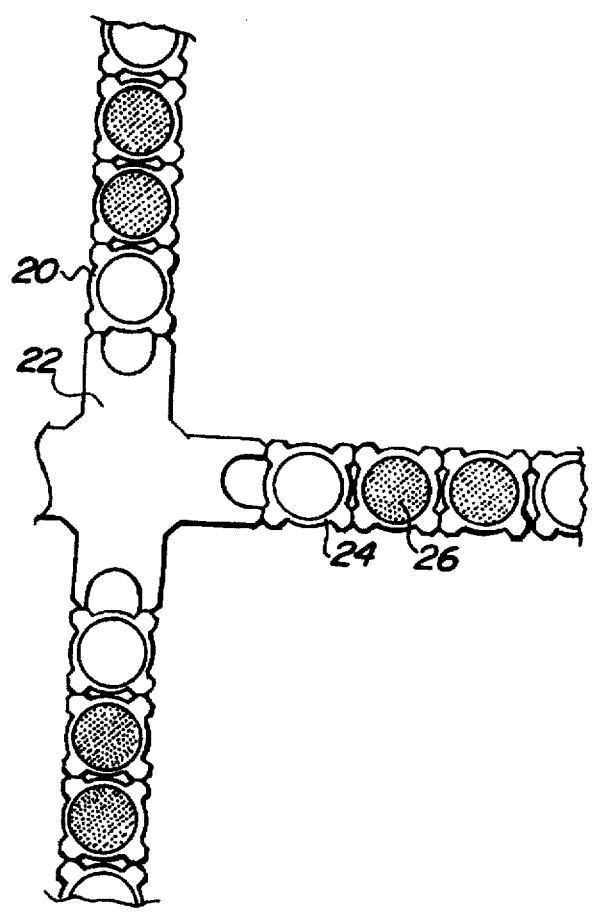
FIG. 2 is an enlarged fragmentary cross-sectional view of the wings of the control rod illustrated in FIG. 1.
Figure 3:
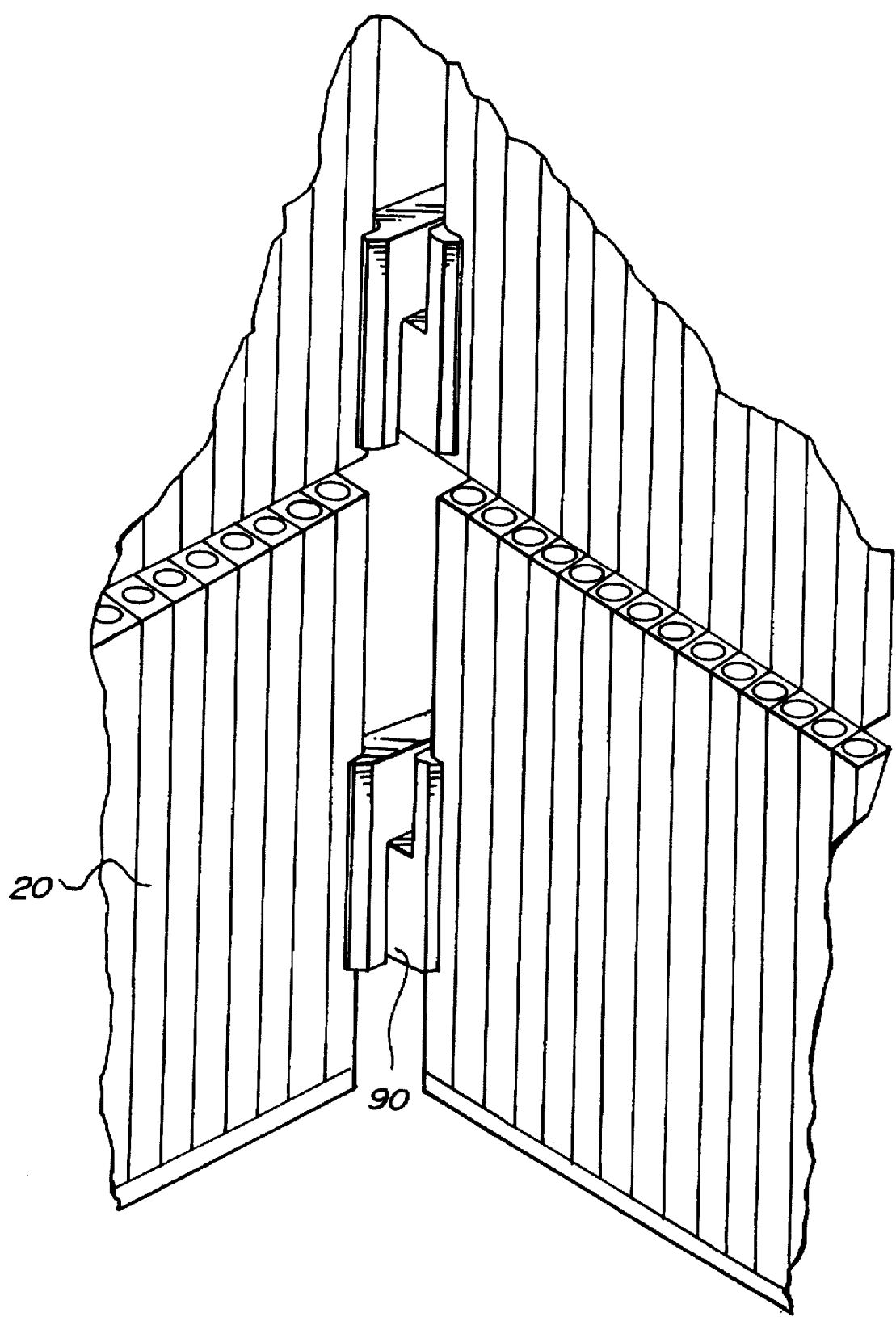
FIG. 3 is an enlarged fragmentary perspective view of a control rod illustrating the interlocking tie rods of the present invention.
Figure 4A:
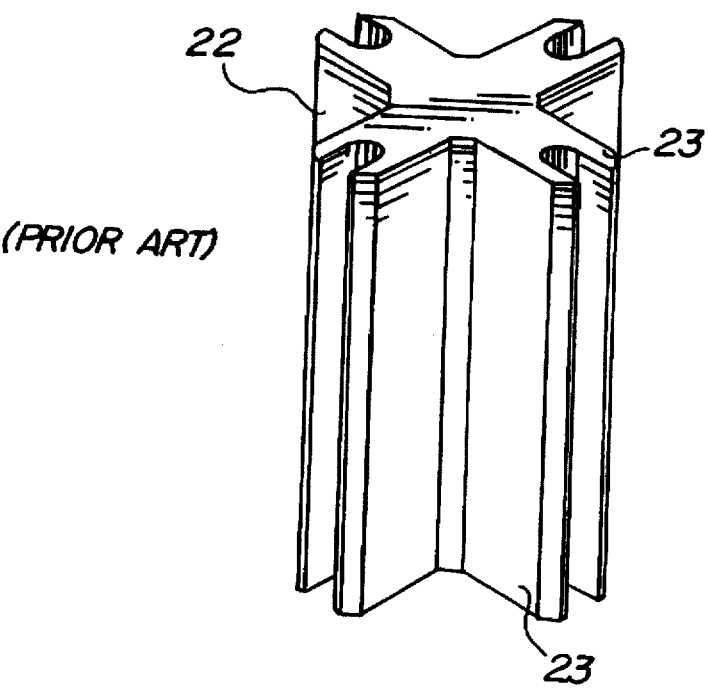
FIGS. 4A and 4B are perspective views of a prior art tie rod and tie rod elements according to the present invention, respectively.

Referring now to the drawing figures, particularly to FIG. 1, there is illustrated a control rod, generally designated 10, for a nuclear reactor and which control rod 10 has a cruciform shape formed by a plurality of blades or wings 12 disposed at right angles relative to one another. Control rod 10 includes an upper handle 14, a lower velocity limiter 16 and a coupling release handle 18. The wings 12 of control rod 10 are, as previously described, formed of tubes 20 generally filled with a boron carbide powder or hafnium for neutron absorption. The individual tubes are welded to one another to form generally planar wings, the wings being rigidly coupled to one another by centrally located, axially spaced tie rods 22 to form the generally cruciform configuration of the control rod 10. The tubes 20 are particularly illustrated in FIG. 2, the manufacture and configuration of which is described and illustrated in U.S. Pat. No. 4,980,535, the disclosure of which is incorporated herein by reference. Particularly, each tube is essentially a square tube having corners formed by protuberances 24 equally spaced about the tube. The tubes are filled with neutron-absorbing material, e.g., boron carbide 26, in capsules or in discrete segments separated, for example, by a separator such as a ball. The tubes 20 are secured one to the other by welding the adjoining protuberances one to the other. Thus, it will be appreciated from a review of FIG. 2 that the weld lines joining the tubes one to the other are located essentially in planes along the opposite side surfaces of each wing. This affords substantial rigidity to the control rod structure by the substantial spacing between the weld lines along opposite side surfaces of the wings. Also illustrated in FIG. 2 are the weld lines welding the innermost tubes of the wings to the tie rod elements 22, those weld lines likewise lying in the planes passing essentially through the opposite side surfaces of the control rod wings. The tie rod element 22 is more particularly illustrated in FIG. 4A and it will be seen that it is essentially in cruciform cross-section having a pair of flanges 23 chamfered for welded engagement with the innermost pair of protuberances of the innermost tube 20 for each wing.

In accordance with the present invention, the tubes 40 hereof are provided with a substantial number of protuberances circumferentially spaced one from the other about the outer surface of each tube and throughout its length. In each case, the number of protuberances is in excess of four for reasons discussed below. For example, in FIG. 6A, there is provided a tube 40, preferably having a hollow cylindrical interior 42, and eight projections or protuberances 44 circumferentially spaced one from the other about the outer surface of the tube 40. The protuberances 44 which lie more closely spaced relative to one another are separated by a recess 46. Protuberances 45 lying along outer opposed sides from the tubes are separated from protuberances 44 by a flat surface 48. Thus, two pair of opposed protuberances 44 lie along side edges of the tubes inwardly of parallel planes passing through the other two pair of protuberances 45 along opposite sides of the tube.

Referring to FIG. 6B, the tube 40b likewise has eight protuberances 44b with pairs being more closely spaced to one another and separated by a short convex surface portion 50, while further spaced-apart protuberances 45b are separated by concave surfaces 52. Protuberances 44b lie along a side edge of the tubes while tubes 45b lie along opposite side surfaces of the tubes.

Referring to FIG. 6C, the protuberances 44c are equally spaced about the outer surface of tube 40c, in this case there being eight protuberances. Each protuberance is spaced from an adjoining protuberances by convex-shaped surfaces 54 which meet at a rounded apex 56 equally spaced from adjoining protuberances 44b. Two pairs of opposed protuberances 44c lie along side edges of the tubes and the other two pairs of protuberances 44c lie along opposite side surfaces of the tubes.

Referring to FIG. 6D, it will be seen that eight protuberances 44d are provided at equally spaced positions about the outer surface of the tube. The protuberances are separated from one another by recesses 58, which may be flat or concave throughout their lengths as indicated by the dashed lines 47. Protuberances 44d project along opposite side edges of the tubes while protuberances 45d project along opposite side surfaces of the tubes.

Referring to FIG. 6E, there are provided eight protuberances which, similarly as in FIG. 6A, lie in pairs. The pairs of protuberances 44e along opposite inner edges of the tubes lie closer together, separated by a convex arcuate portion 60. The pairs of protuberances 45e in the opposed outer surfaces are spaced one from the other by linear sides 62 and from the first-mentioned pairs of protuberances by similar linear sides 62.

Finally, in FIG. 6F, there is provided a tube 40f in which the pairs of protuberances 44f along opposite edges are separated one from the other by a convex surface 64. The protuberances 45f which are spaced between the pairs of protuberances and separated from the pairs of protuberances by convex surfaces 68 lie along opposed outer surfaces of the tube.

In all cases, as will be seen from a review of FIGS. 6A–6F, the pairs of protuberances on each of the opposite edges of the tubes lie close together and are spaced inwardly from the opposite sides of the tubes which form the outer surfaces of the wings. From a review of FIGS. 5A–5C, it will be seen that when the tubes are joined one to the other to form the wings of the cruciform control rod, the lines of weld material joining the adjacent tubes and more particularly joining the adjacent protuberances along the side edges of the tubes to one another lie in planes spaced inwardly from side planes along the outer surfaces of the wings distances 50% or more of the spacing between the side planes and the centerline plane passing through the axes of the tube. Thus, as illustrated in FIG. 6A, and applicable to all embodiments of the tubes, the side edge protuberances 44, and hence the weld lines between adjacent tubes, lie in planes P which are spaced inwardly a distance from side planes S.P. a distance 50% or more of the distance between side planes S.P. and a centerline plane C.L.P. through the axes of the tubes.

Figure 7A:
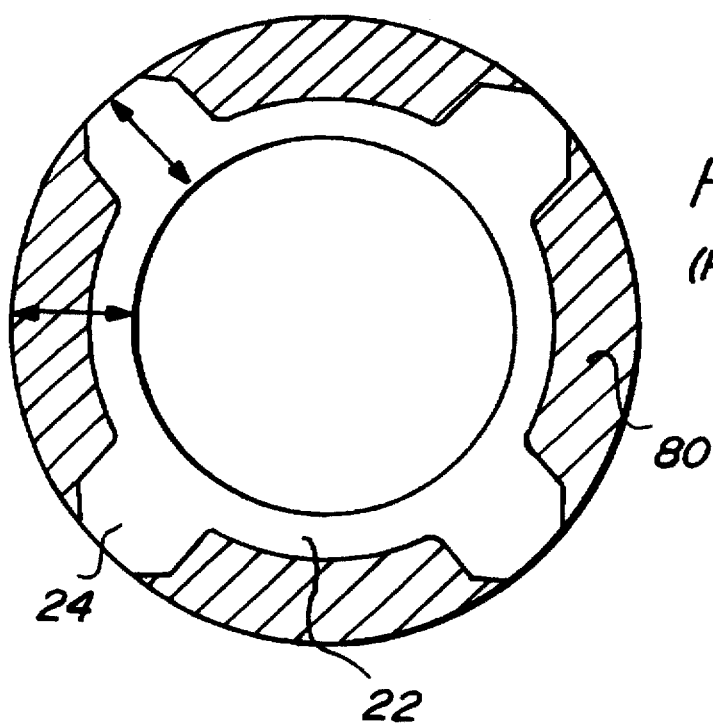
FIGS. 7A and 7B are schematic illustrations of the manner of forming the control rod tubes according to the prior art and the present invention, respectively.
Figure 7B:
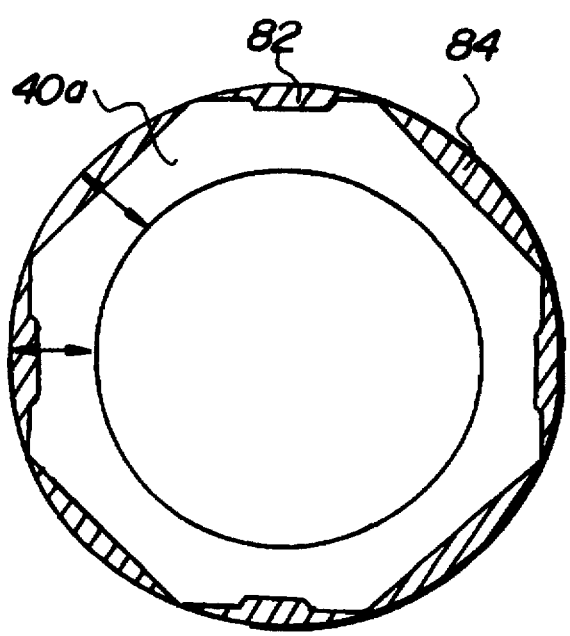

Referring now to FIGS. 7A and 7B, it will be appreciated that the increased number of protuberances as compared with the prior art, i.e., in excess of four, enables a reduction in the overall wall thickness of the tube and hence a reduction in the stiffness of the tube, i.e., an increase in its flexibility. For example, and referring to FIG. 7A, the tubes of the prior art having the four projections as noted above, are typically formed by rolling sheet material into an annular tube and cutting away the excess material. The excess material 80, as indicated by the cross-hatched lines, is thus cut away between the protuberances. With the four protuberances being equally spaced one from the other, it will be appreciated also that the weld lines connecting the side protuberances to adjoining tubes will lie further outwardly toward the side surfaces of the wings than the weld lines joining the protuberances to the tubes of the present invention. In FIG. 7B, illustrating the embodiment hereof of FIG. 6A, it will be appreciated that the annular rolled tube may have a smaller outside diameter in forming the tube 40a as compared with the outside diameter of the tube forming the prior art tube illustrated in FIG. 7A. Thus, the material required to be removed, i.e., the material between the protuberances indicated at 82 and 84, is substantially reduced, providing improved producibility of the tubes while simultaneously the flexibility of the control rod is enhanced. Furthermore, the pairs of side edge protuberances are located well inwardly of the side planes of the wings, i.e., in excess of 50% of the distance between the side planes and the centerline plane, to locate the weld lines closer to one another and hence improve the flexibility of the tube.

Figure 4B:
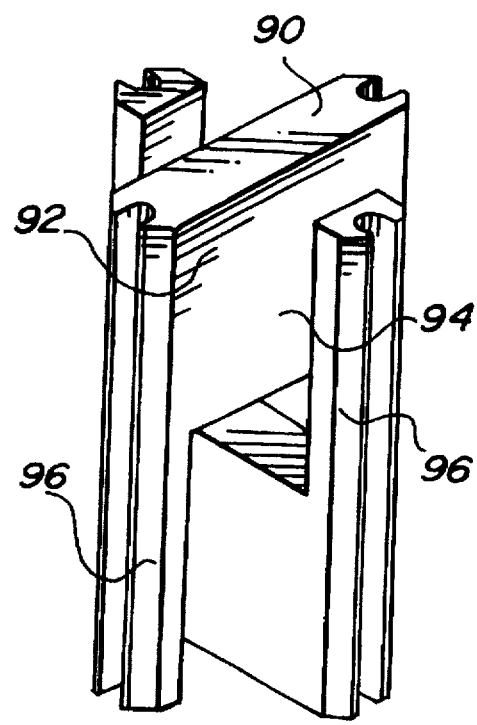

Referring now back to FIG. 4B and to FIGS. 5A–5C, it is a further aspect of the present invention that the coplanar wings of the control rod are laterally movable relative to the perpendicularly located coplanar wings. To accomplish this, the coplanar opposite wings are secured to one another by tie rods 90 at axially spaced locations along the control rod. The tie rods 90 include generally U-shaped elements 92 each having a base 94 and a pair of legs 96 projecting from the base. Pairs of these elements are interlocked along the centerline of the control rod with the base of each element being received between the legs of the other element. The legs are spaced apart a distance in excess of the thickness of the base whereby the base can move relative to the legs of the other element. Hence, each pair of wings is movable laterally between to the other pair of coplanar wings.

The construction of the wings with the weld lines between adjacent tubes thereof lying substantially inwardly of the outer side surfaces of the wings and the tubes with reduced material enables the control rod to have substantial flexibility. In addition, the lateral movement of one set of coplanar wings relative to the other set of coplanar wings supplements this flexibility and enhances the capability of the control rod to move into and out of the region of the core between the fuel assembly channels.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control rod for disposition in a nuclear reactor core having coolant therein comprising:

a control rod body having an axis and mutually perpendicular wings having surfaces for contact with the coolant in the core, first and second pairs of said wings lying in respective common planes with the wings of each pair on opposite sides of the control rod body axis, said wings of said first pair being fixedly connected to one another by a first element for joint movement in a first radial direction and said wings of said second pair being fixedly connected to one another by a second element for joint movement in a second radial direction different than said first radial direction, said elements being constructed to enable lateral movement relative to one another thereby enabling lateral movement of said first and second pairs of wings relative to one another.

2. A control rod according to claim 1 wherein said first element forms a stop for limiting the lateral movement of said second pair of wings and said second element forms a stop for limiting the lateral movement of said first pair of wings.

3. A control rod according to claim 1 wherein each of said elements extends across said axis of the control rod body.

4. A control rod according to claim 1 wherein said first element forms a stop for limiting the lateral movement of said second pair of wings and said second element forms a stop for limiting the lateral movement of said first pair of wings, each of said elements extending across said axis of the control rod body.

5. A control rod according to claim 4 wherein each said element has a generally U-shaped configuration with a base and a pair of legs extending from the base, the legs of said first element being secured to innermost edges of said first pair of wings and the legs of said second element being secured to innermost edges of said second pair of wings, the elements being disposed such that the base of each element lies between the legs of another element, the legs of said first element being spaced apart a distance in excess of the thickness of the base of said second element, the legs of said second element being spaced apart a distance in excess of the thickness of the base of said first element to enable said relative lateral movement of said first and second pairs of wings.

6. A control rod according to claim 1 wherein each wing has a plurality of elongated tubes disposed in side-by-side relation to one another, each said tube carrying neutron-absorbing material.

7. A control rod according to claim 1 wherein each wing includes a plurality of elongated tubes disposed side-by-side and forming an array thereof between two planes defining respective opposite side surfaces of said array, each of said tubes having neutron-absorbing material and being joined one to the other along joint lines lying in planes spaced inwardly from and parallel to said side planes and on opposite sides of a plane through the axes of said tubes, said planes containing said joint lines being spaced inwardly from said side planes a distance equal to 50% of more of the distance between said plane through the axes of said tubes and said side planes thereby forming a control rod of reduced stiffness and improved flexibility.

8. A control rod according to claim 7 wherein each of said tubes has a plurality of protuberances circumferentially spaced from one another about an outer surface of said tube with pairs of said protuberances along generally opposite side edges of said tube in said inwardly spaced planes, respectively, being joined to corresponding pairs of protuberances of said adjoining tubes.

9. A control rod according to claim 8 wherein said protuberances are in excess of four about each tube.

10. A control rod according to claim 9 wherein said protuberances are at least six in number.

11. A control rod according to claim 9 wherein said protuberances are eight in number.

* * * * *